UNITED STATES PATENT OFFICE.

FRANZ SCHOLL, OF HÖCHST-ON-THE-MAIN, GERMANY, ASSIGNOR TO THE FARBWERKE, VORM. MEISTER, LUCIUS & BRÜNING, OF HÖCHST-ON-THE-MAIN, GERMANY, A CORPORATION OF GERMANY.

ORANGE-RED DYE AND PROCESS OF MAKING SAME.

SPECIFICATION forming part of Letters Patent No. 695,238, dated March 11, 1902.

Application filed December 21, 1900. Serial No. 40,672. (Specimens.)

*To all whom it may concern:*

Be it known that I, FRANZ SCHOLL, Ph. D., a citizen of the German Empire, and a resident of Höchst-on-the-Main, in the German Empire, have invented certain new and useful Improvements in Orange-Red Dyes and Processes of Making Same, of which the following is a specification.

I have found that a series of orange-yellow to orange-red mordant dyestuffs may be obtained if 5-pyrazolone and its derivatives, being non-substituted in the fourth position, are combined with the diazo compounds of ortho-amidophenol and its derivatives. Most of these dyestuffs are valuable as acid dyestuffs. Their fastness, however, is considerably increased by the formation of lakes. The chrome-lake is formed either by dyeing goods previously mordanted or by subsequent treatment with chromium-fluorid or bichromate. The lake-dyes meet every requirement as regards fastness. Of the pyrazolone derivatives as combining substances phenylmethylpyrazolone and its sulfonic acid generally yield yellower tints and the pyrazolones containing the carboxyl group redder ones. Of the diazo compounds of the amidophenol derivatives those of the nitro-ortho-amidophenolsulfonic acids are particularly valuable for obtaining red shades.

I illustrate my process as follows:

First. Twenty-five kilos of 6-nitro-2-amidophenol-4-sulfonate of sodium (German Patent No. 93,443, Friedländer IV, page 765) are dissolved in about five hundred liters of water and diazotized by adding seven kilos of sodium nitrite and twenty-five kilos of hydrochloric acid of thirty-per-cent. strength. The clear diazo solution is slowly run while stirring into a solution of thirty-eight kilos of the di-sodium salt of 1-para-sulfophenyl-5-pyrazolone-3-carboxylic acid (*Annalen* 294, 232) in about two hundred liters of water. After some hours the solution is gently heated, and the dyestuff is salted out by adding common salt. It separates as an orange-brown crystalline powder. The formation of the dyestuff is accelerated by adding when cooling sodium carbonate or sodium acetate.

In the foregoing example 4-nitro-2-amidophenol-6-sulfonic acid may be substituted for 6-nitro-2-amidophenol-4-sulfonic acid and equivalent quantities of 1-phenyl-5-pyrazolone-3-carboxylic acid or para-sulfophenyl-3-methyl-5-pyrazolone may be substituted for 1-para-sulfophenyl-5-pyrazolone-3-carboxylic acid.

Second. Twenty-five kilos of 4-nitro-2-amidophenol-6-sulfonate of sodium (French Patent No. 280,031) are diazotized as in Example I. The diazo compound thus formed is run while stirring into a solution of nineteen kilos of 1-phenyl-3-methyl-5-pyrazolone, twelve kilos of soda-lye of 40° specific gravity, and six kilos of sodium carbonate in about two hundred liters of water. After some hours the solution is gently heated, and the dyestuff is separated by adding a little common salt as a red crystalline powder. In this example 6-nitro-2-amidophenol-4-sulfonic acid may be substituted for 4-nitro-2-amidophenol-6-sulfonic acid.

Having now described my invention, what I claim is—

1. The herein-described process of making mordant dyestuffs, which consists in diazotizing the products of substitution of ortho-amidophenol and combining the diazo compounds thus obtained with substances containing 1-phenyl-5-pyrazolone, substantially as set forth.

2. As a new product, the orange-red mordant dyestuff, having the formula:

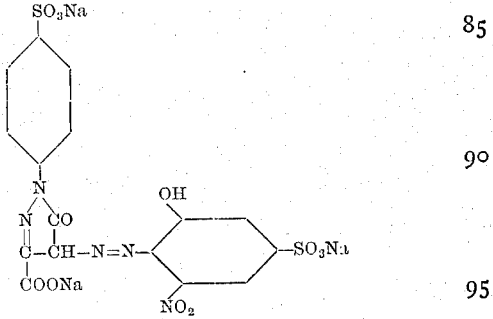

and obtained by the diazotization of 6-nitro-2-amidophenol-4-sulfonic acid and the combination with para-sulfo-1-phenyl-5-pyrazolone-3-carboxylic acid, being an orange-brown crystalline powder, readily soluble in water to an orange-red solution, insoluble in alcohol, ether, benzene and petroleum, soluble in concentrated sulfuric acid to a clear yellow solution, dyeing unmordanted wool in an acid-bath red and forming an orange-red chrome-lake, substantially as set forth.

In testimony that I claim the foregoing as my invention I have signed my name in presence of two subscribing witnesses.

FRANZ SCHOLL.

Witnesses:
 HEINRICH HAHN,
 ALFRED BRISBOIS.